United States Patent Office 3,464,978
1-SUBSTITUTED UREA ALKYL 1,2-DIHYDRO-1,4-BENZODIAZEPINES AND BENZODIAZEPIN-2-ONES
James Valentine Earley, Cedar Grove, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 632,529, Apr. 21, 1967. This application Oct. 23, 1967, Ser. No. 677,092
Int. Cl. C07d 53/06, 57/00; A61k 27/00
U.S. Cl. 260—239.3                    23 Claims

ABSTRACT OF THE DISCLOSURE 1,2-dihydro-1,4-benzodiazepines and benzodiazepin-2-ones which have an aminoalkyl or alkyl cyanamide or substituted alkyl urea at the 1-position useful as hypnotics, psychosedatives, anticonvulsants, sedatives and muscle relaxants and a process for preparing these compounds.

CROSS REFERENCE TO RELATED APPLICATIONS

This application is a continuation-in-part of application Ser. No. 632,529, filed Apr. 21, 1967, now abandoned.

SUMMARY OF THE INVENTION

In accordance with the invention, 1,4-benzodiagepines and 1,4-benzodiazepin-2-ones selected from the group consisting of compounds of the formula:

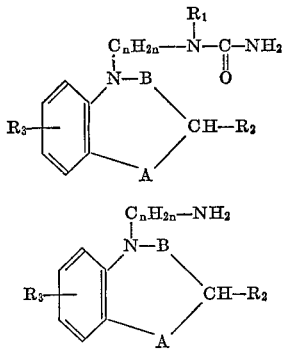

I

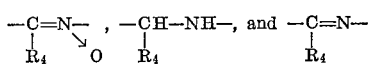

II and pharmaceutically acceptable salts thereof, wherein A is selected from the group consisting of $$-\underset{\underset{R_4}{|}}{C}=N-\underset{O}{\searrow}, \quad -\underset{\underset{R_4}{|}}{CH}-NH-, \text{ and } -\underset{\underset{R_4}{|}}{C}=N-$$

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is hydrogen, halogen, lower alkyl, nitro, cyano and trifluoromethyl, and $R_4$ is selected from the group consisting of phenyl, lower alkyl substituted phenyl, halo substituted phenyl, nitro substituted phenyl, and pyridyl have been found to be useful as hypnotics, psychosedatives, anticonvulsants, sedatives and muscle relaxants.

The benzodiazepines or benzodiazepin-2-ones of Formula I above, are prepared from 1-substituted dialkyl amino alkyl-1,4-benzodiazepines of 1,4-benzodiazepin-2-ones of the formula:

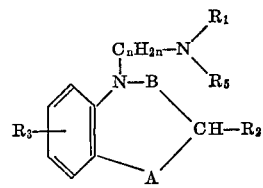

III wherein $n$, A, B, $R_1$ and $R_2$ are as above, and $R_5$ is a lower alkyl, by first treating the compound of the Formula III above with a cyanogen halide to produce a compound of the formula

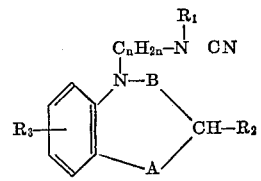

IV wherein A, B, $n$, $R_1$, $R_2$ and $R_3$ are as above which is also useful as an anticonvulsant, muscle relaxant, sedative, hynotic and psychosedative.

The compounds of Formula IV above can be converted into the compounds of Formula I above by treating the compounds of Formula IV above, with a hydrolyzing agent.

On the other hand, the compound of Formula IV above can be converted into known therapeutically active compounds of the formula:

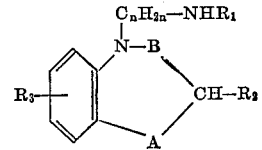

V wherein $n$, A, B, $R_1$, $R_2$ and $R_3$ are as above, which are described in U.S. Patent No. 3,299,053, Jan. 17, 1967, Archer et al., by treating the compound of the Formula IV above with a strong acid.

1-substituted amino alkyl-benzodiazepine or benzodiazepin-2-one compounds of the Formula II above can be prepared from 1 unstituted benzodiazepin-2-one compounds of the formula:

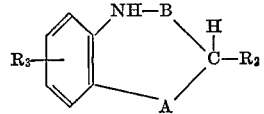

VI wherein $R_2$, $R_3$, A and B are as above, by first treating the 1-sodio derivative of the compound of Formula VI above with a halo substituted alkyl carbobenzoxy amine wherein the alkyl group contains from 2 to 7 carbon atoms to form a compound of the formula:

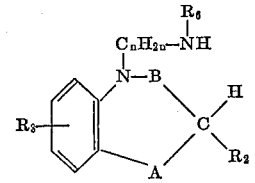

VII wherein $n$, $R_2$, $R_3$, A and B are as above, and $R_6$ is carbobenzoxy.

The compound VII above is converted into the therapeutically active compounds of Formula II above by subjecting compounds of Formula VII above to hydrolysis or hydrogenolysis.

DETAILED DESCRIPTION OF THE INVENTION

The term "lower alkyl" includes both straight and branched chain alkyl groups having from 1 to 7 carbon atoms such as methyl, ethyl, propyl, isopropyl, and the like. The term "lower alkanoyloxy" refers to both straight chain and branched chain aliphatic carboxylic acid moieties such as acetoxy, propionyloxy butyryloxy and the like. The term halogen includes bromine, chlorine, fluorine and iodine. The preferred benzodiazepines and benzodiazepin-2-ones of Formulae I and II above are the 7-substituted benzodiazepin-2-ones or benzodiazepines wherein $R_3$ in the 7-position is either a halogen, trifluoromethyl or nitro. When $R_3$ is a halogen in the 7-position, the preferred halogens are chlorine and bromine.

In accordance with this invention, $R_4$ can be a phenyl radical such as monofluorophenyl, monochlorophenyl, etc. Furthermore, $R_4$ can be a pyridyl radical such as 2-pyridyl. When $R_4$ is a phenyl radical, the preferred radical is either phenyl, orthofluorophenyl or orthochlorophenyl. When $R_4$ is a pyridyl radical, the preferred radical is 2-pyridyl.

In accordance with this invention, $R_2$ is either hydrogen, or a lower alkyl radical, preferably methyl or ethyl, a hydroxy radical or a lower alkanoyloxy radical, preferably acetoxy. The symbolic grouping —$C_nH_{2n}$— represents straight or branched chain alkyl groups containing 2 or more carbon atoms between the nitrogen atoms joined thereby, such as ethylene, propylene, isopropylene, butylene and the like. In a preferred aspect of this invention, $n$ is either 2 or 3.

The compounds of Formulae I, II and IV above demonstrate a very high degree of activity as sedatives, muscle relaxants and anticonvulsants. This high degree of muscle relaxant and psychosedative activity is clearly demonstrated when mice, which are administered the compounds of Formulae I, II and IV above, are tested by means of either the standard inclined screen or standard foot shock test. This high degree of sedative activity is clearly demonstrated when cats, which are administered the compounds of Formulae I, II and IV above, are tested by means of the standard unanesthetized cat test. Furthermore, the high degree of anticonvulsant activity is clearly demonstrated when mice, which have been administered the compounds of Formulae I, II and IV above, are tested by means of the standard maximal electro shock test.

Also included within the purview of the present invention are the acid addition salts of the novel medicinally valuable compounds of Formulae I, II and IV above. More particularly, the compounds of Formula I above form acid addition salts with pharmaceutically acceptable organic or inorganic acids such as hydrochloric acid, hydrobromic acid, nitric acid, sulfuric acid, acetic acid, formic acid, succinic acid, maleic acid, p-toluene sulfonic acid and the like.

The compounds of Formulae I, II and IV above are useful as hypnotics, physcosedatives, anticonvulsants, sedatives and muscle relaxants. The compounds of Formulae I, II and IV above, as well as their pharmaceutically acceptable acid addition salts, are used in the form of conventional pharmaceutical preparations which contain said compounds in connection with conventional pharmaceutical organic or inorganic materials suitable for internal administration. The pharmaceutical compositions containing the compounds of Formulae I, II and IV above, as well as their pharmaceutically acceptable acid addition salts, can be administered parenterally or orally. Dosages can be adjusted to individual requirements, for example, these compounds can be administered in dosages of from about 0.1 mg./kg. to about 5.0 mg./kg. per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid dosage forms such as tablets, dragees, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They also can contain other therapeutically useful materials.

In accordance with this invention, the compounds of Formulae I, II and IV and their pharmaceutically acceptable salts exhibit the aforementioned beneficial therapeutic properties. The compounds of Formulate I, II and IV above form pharmaceutically acceptable acid addition salts with both inorganic and organic pharmaceutically acceptable acids, such as hydrochloric acid, hydrobromic acid, sulfuric acid, phosphoric acid, citric acid, acetic acid, succinic acid, maleic acid, methane sulfonic acid, p-toluene sulfonic acid and the like. Such acid addition salts are also within the scope of the invention.

The compounds of Formula III above are converted to compounds of Formula IV above by treating the compounds of Formula III above with a cyanogen halide such as cyanogen bromide or cyanogen chloride. Generally this reaction is carried out in the presence of an inert organic solvent. Any conventional inert organic solvent can be utilized in carrying out the conversion of compound of the Formula III to compounds of the Formula IV above. Included among the solvents suitable for the purpose of the present invention, are hydrocarbons, such as benzene, toluene, xylene, and the like; chlorinated hydrocarbons such as ethylene chloride, chlorobenezne, and the like; ethers such as tetrahydrofuran, diethylether, dioxane and the like, or any other suitable solvent. In forming compounds of the Formula IV above from compounds of the Formula III above, the preferred solvents are chloroform and benzene. Furthermore, it is generally preferred to carry out this reaction at the refluxing temperature of the solvent. However, in carrying out this reaction, temperature and pressure are not critical and this reaction can be carried out at room temperature.

The conversion of compounds of the Formula IV above to compounds of the Formula I above is carried out by treating the compound of the Formula IV above with a hydrolyzing agent. The hydrolyzing agent can be a peroxide such as a dilute hydrogen peroxide, which is an aqueous solution containing from about 1 percent to about 10 percent by weight of hydrogen peroxide or a strong inorganic acid such as concentrated sulfuric acid, or polyphsphoric acid. If a peroxide is utilized as the hydrolyzing agent, this reaction is preferably carried out in an alkaline media at temperatures of from 15–45° C. Generally, it is preferred to conduct this hydrolysis by means of a peroxide at temperatures of from 20–40° C. in the presence of a strong base. Any conventional strong base such as the alkali metal hydroxide or alkaline earth metal hydroxide can be utilized to provide the alkaline media in accordance with this invention. Typical alkalis which can be utilized in this reaction are included sodium hydroxide, potassium hydroxide, calcium hydroxide and lithium hydroxide. Furthermore, it is generally preferred to carry out the hydrolysis by means of a peroxide in the presence of an inert organic solvent. Any of the hereinbefore mentioned inorganic solvents can be utilized.

dihydro - 2 - oxo-1,4-benzodiazepin - 1 - yl]ethyl}urea as white rods.

Method B

A solution of 0.1 g. (0.00026 m.) of 7-chloro-5-(2-fluorophenyl)-1,3-dihydro - 1 - (2 - [N-cyano-N-ethylamino]ethyl)-2H-1,4-benzodiazepin - 2 - one in 4 ml. of concentrated sulfuric acid was heated at 95° for 5 hours, cooled and poured onto ice. The solution was made basic with ammonium hydroxide, and was extracted with 2× 40 ml. of dichloromethane. The combined organic extracts were dried over anhydrous sodium sulfate and evaporated to dryness. Recrystallization of the residue from a mixture of dichloromethane and ether gave 1-ethyl - 1 - {2[7-chloro - 5 - (2-fluorophenyl)-1,3-dihydro-2-oxo-1,4-benzodiazepin - 1 - yl]ethyl}urea.

EXAMPLE 4

A solution of 33.9 g. (0.116 m.) of 7-chloro-1,3-dihydro-5-(2-fluorophenyl)-2H-1,4-benzodiazepin - 2 - one in 150 ml. of dry N,N-dimethylformamide was treated with 5.1 g. (0.127 m.) of a 60 percent dispersion of sodium hydride in mineral oil. The resulting solution was stirred at room temperature for 30 min. and then treated with 30 g. (0.116 m.) of carbobenzoxy-2-bromoethylamine. The reaction mixture was then stirred at room temperature for 2 hrs., poured into 500 ml. of water and extracted with dichloromethane (3× 200 ml.). The combined organic layers were washed with water (3× 50 ml.) saturated brine, dried over anhydrous sodium sulfate, filtered and evaporated to give 60.1 g. of an amber oil. This oil was dissolved in 1.5 l. of ether and the product was allowed to crystallize slowly. Filtration gave 1-[2-(benzyloxycarbonylamino)ethyl]-7-chloro-1,3-dihydro-5 - (2-fluorophenyl)-2H-1,4-benzodiazepin-2-one as white prisms.

EXAMPLE 5

A suspension of 10 g. (0.0214 m.) of 1-[2-(benzyloxycarbonylamino)ethyl]-7-chloro-1,3-dihydro-5-(2 - fluorophenyl)-2H-1,4-benzodiazepin-2-one in 20 ml. of glacial acetic acid was treated at room temperature with 20 ml. of a 33 percent (w/w) solution of hydrogen bromide in glacial acetic acid. The reaction mixture was stirred for 2 hr., and then diluted with 1 l. of ether. The product, as the dihydrobromide, was removed by filtration, washed with ether and acetone and then recrystallized from a mixture of methanol and acetone to give 10.0 g. of the dihydrobromide.

The salt was suspended in dichloromethane and treated with an excess of dilute ammonium hydroxide. The mixture was shaken thoroughly and the layers wer separated. The organic layer was washed with water, dried over anhydrous sodium sulfate, filtered and evaporated. The base, thus obtained was then dissolved in a small amount of ethanol and treated with an excess of a solution of hydrogen chloride in ethanol. The addition of ether caused the dihydrochloride to precipitate and the salt was obtained by filtration. Recrystallization from ethanol gave the pure 1 - (2 - amino ethyl) - 7 - chloro-1,3-dihydro-5-(2-fluorophenyl)-2H-1,4-benzodiazepin-2-one as white prisms.

EXAMPLE 6

A solution of peracetic acid was prepared by cooling 25 ml. of dichloromethane to 10° C., adding 7.5 ml. of 90 percent hydrogen peroxide (0.275 m.), 1 drop of concentrated sulfuric acid followed by the dropwise addition of 33.6 g. of acetic anhydride (0.33 m.). The reaction mixture was stirred at 10° for 15 minutes and then at room temperature for 30 minutes.

The peracetic acid solution was then added dropwise (25 min.) to a solution of 72.2 g. (0.25 m.) of 7-chloro-1,3-dihydro-5-(2-fluorophenyl)-2H-1,4-benzodiazepin - 2-one in 1.35 l. of dichloromethane at 10°. The reaction mixture was then allowed to stand at room temperature for 4 days.

The reaction mixture was divided into three 460 ml. portions, and each was worked up in the following manner: The aliquot was washed with water (3× 400 ml.), 10 percent ammonium hydroxide (1× 100 ml.), water (2× 300 ml.), 2 N hydrochloric acid (1× 250 ml.), water (2× 300 ml.), and a saturated brine solution. The organic layer was then dried over anhydrous sodium sulfate and tested for the presence of peroxides with a zinc reduced solution of potassium thiocyanate, ferrous sulfate heptahydrate and dilute sulfuric acid. If the test proved negative, the solution was evaporated to near dryness and ether was added. The crystalline precipitate was obtained by filtration. The combined products were recrystallized from a mixture of acetone, methanol and petrol (30–60°) to give 7-chloro-1,3-dihydro-5-(2-fluorophenyl)-2H-1,4-benzodiazepin-2-one 4-oxide as white prisms.

EXAMPLE 7

A solution of 38.0 g. (0.125 m.) of 7-chloro-1,3-dihydro-5-(2-fluorophenyl) - 2H-1,4-benzodiazepin-2-one 4 oxide in 100 ml. of N,N-dimethylformamide was treated with a solution of sodium methoxide in methanol (0.15 m. of NaOCH$_3$ added) and was stirred at room temperature for one hour.

A toluene solution of 2-chloro-N,N-diethylethylamine was then slowly added to the solution of the sodio derivative of 7-chloro-1,3-dihydro-5-(2-fluorophenyl)-2H-1,4-benzodiazepin-2-one 4 oxide. An additional 100 ml. of N,N-dimethylformamide was added, and the cloudy reaction mixture was stirred at 30° for 2 hours, and then at 40° for 0.5 hours. The reaction mixture was filtered and evaporated to dryness under reduced pressure. The residual oil was then partitioned between 300 ml. of water and 300 ml. of dichloromethane. The layers were separated and the aqueous phase was extracted with 100 ml. of dichloromethane. The combined organic layers were washed with water (4× 300 ml.), saturated brine solution, dried over anhydrous sodium sulfate, and evaporated to dryness. The residual oil was crystallized from a mixture of ethyl ether and petroleum ether (30–60°) to give 7-chloro-1-[2-(diethylamino)ethyl]-5-(2 - fluorophenyl)-1,3-dihydro-2H-1,4-benzodiazepin-2-one 4 oxide as white prisms.

The solution of 2-chloro-N,N-diethylethylamine was prepared as follows: 171 g. (0.25 m.) of the hydrochloride was added to 30 g. of crushed ice. 10 N sodium hydroxide was added until pH 11. The solution was then extracted with three 35 ml. portions of toluene. The combined toluene extracts were filtered over celite, washed with two portions of a saturated brine solution and dried over anhydrous sodium sulfate.

EXAMPLE 8

A solution of 41 g. (0.1 m.) of 7-chloro-1-[2-(diethylamino)ethyl] - 5 - (2 - fluorophenyl) - 1,3 - dihydro-2H - 1,4 - benzodiazepin - 2 - one 4 - oxide in 330 ml. of acetic anhydride was stirred and heated under reflux for 1 hr. The solution was evaporated to near dryness and the residue was dissolved in 200 ml. of water. A 50 percent potassium carbonate solution was added to pH 9, and the resulting mixture was extracted into 200 ml. of dichloromethane. The dichloromethane extract was washed with water (4× 400 ml.) saturated brine solution, dried over anhydrous sodium sulfate, and evaporated to dryness to give 49.5 g. of a dark oil.

The oil was dissolved in a small amount of benzene and filtered over 250 g. of silica gel using hexane as the eluent to give, after solvents were removed, 32 g. of an oil. The silica was next eluted with ethyl acetate to give after removal of the solvent, 6.1 g. of an oil. The first fraction was triturated with two 100 ml. portions of boil- The compounds of Formula IV above can be converted to compounds of Formula I above by means of utilizing a strong acid. This reaction is carried out by means of treating the compound of Formula IV above with an inorganic acid, preferably concentrated sulfuric acid having a sulfuric acid concentration of from about 80 percent to about 95 percent by weight. Generally, this reaction can be carried out at from about room temperature to about 120° C. In carrying out this reaction with a strong concentrated acid, it is best if the temperature does not exceed 120° C. This is true since the compound of Formula I will not be the major product formed at very high temperature. Generally in utilizing concentrated inorganic acids, it is preferred to utilize a temperature within the range of from about 80–100° C.

If it is desired to convert compounds of the Formula IV above into the known therapeutically active compounds of the Formula V above, this is carried out by treating compounds of the Formula IV above with a concentrated inorganic acid at temperatures of from about 150° C. to about 210° C. In carrying out this reaction, it is preferred to utilize temperatures ranging from 180° C. to about 200° C. Furthermore, in carrying out this reaction, any concentrated acid such as sulfuric or polyphosphoric acid can be utilized with sulfuric acid being preferred.

In accordance with another embodiment of this invention, compounds of the Formula II above are prepared from compounds of the Formula VI above by reacting the alkali metal derivative of compounds of the Formula VI above with a halo-substituted alkyl carbobenzoxy amine wherein the alkyl group contains from 2 to 7 carbon atoms. In this manner compounds of the Formula VII above are formed. In carrying out this reaction, any halo-substituted alkyl carbobenzoxy amine wherein the alkyl group contains from 2 to 7 carbon atoms can be utilized. Typical halo-substituted lower alkyl carbobenzoxy amines which can be utilized in accordance with this invention are carbobenzoxy-2-bromoethyl-amine, carbobenzoxy-2-chloroethyl-amine, carbobenzoxy - 3-chloropropyl amine, carbobenzoxy-4-bromobutyl amine, etc. In carrying out this reaction, the alkali metal derivative of Formula VI above is prepared by treating a solution of Formula VI in an inert organic solvent with a base. Any conventional organic or inorganic base such as an alkali metal hydride, e.g., sodium hydride, potassium hydride can be utilized. Organic alkalis such as sodium methoxide, potassium methoxide, etc. can be utilized. In carrying out this reaction to produce a compound of the Formula VI above, any conventional inert organic solvent such as those hereinbefore mentioned can be utilized. Among the preferred solvents which can be utilized are included tetrahydrofuran and N,N-dimethylformamide. Temperature and pressure in this reaction are not critical and the reaction can be effected at room temperature and atmospheric pressure or at elevated temperatures and/or reduced pressure. Generally, it is preferred to utilize a temperature of from 10° C. to 20° C. in carrying out this reaction.

Compounds of Formula VII are converted to compounds of Formula II by means of treating compounds of Formula VII with a hydrolyzing agent. Any conventional hydrolyzing agent can be utilized in carrying out this reaction. Among these agents suitable for use in converting the compounds of Formula VII above to the compounds of Formula II above may be included acid agents such as the hydrohalide acids, e.g., hydrogen chloride, hydrogen bromide, and the like. Generally, this reaction is carried out in the presence of a liquid organic acid such as acetic acid, propionic acid, etc. In carrying out this reaction, temperature and pressure are not critical and this reaction can be carried out at room temperature and at atmospheric pressure or at elevated temperatures and/or reduced pressure.

Another means for converting the compounds of Formula VII into the compounds of Formula II is by hydrogenolysis. Any conventional means of hydrogenolysis can be utilized in carrying out this reaction. Typical methods of hydrogenolysis include hydrogenation in the presence of a noble metal catalyst such as platinum or palladium. Generally, hydrogenolysis is carried out in the presence of an inert liquid organic solvent such as any of the herein before mentioned solvents. In carrying out this reaction temperature and pressure are not critical and this can be carried out at room temperature and at atmospheric pressure or at elevated temperatures and/or reduced pressure.

The following examples are illustrative, but not limitative of the invention. All temperatures are stated in degrees C. The ether utilized in the examples was diethyl ether.

EXAMPLE 1

To 4.0 g. (0.0393 m.) of cyanogen bromide dissolved in 60 ml. of chloroform was added dropwise a solution of 10 g. (0.0258 m.) of 7-chloro-1-(2-diethylaminoethyl)-5-(2-fluorophenyl)-1,3-dihydro - 2H - 1,4-benzodiazepin-2-one dissolved in 90 ml. of chloroform. The reaction mixture was refluxed for 4 hrs. using an air condenser and was then cooled to room temperature. The resulting solution was extracted with 50 ml. of 2 N hydrochloric acid. The chloroform layer was washed with 50 ml. of dilute ammonium hydroxide, 50 ml. of saturated brine solution, dried over anhydrous sodium sulfate and was then evaporated to dryness. The residue was recrystallized twice from methanol to yield 7-chloro-5-(2-fluorophenyl) - 1,3 - dihydro - 1 - (2-[N-cyano-N-ethylamino]ethyl)-2H-1,4-benzodiazepin - 2 - one as white rods.

EXAMPLE 2

A solution of 2.0 g. (0.0052 m.) of 7-chloro-5-(2-fluorophenyl)-1,3 - dihydro - 1 - (2-[N-cyano-N-ethylamino]ethyl)-2H-1,4 - benzodiazepin - 2 - one was dissolved in concentrated sulfuric acid, and heated at 175° for 2 hours. The solution was cooled to approximately 10°, made neutral with ammonium hydroxide, and was then reacidified (pH 6) with dilute sulfuric acid. The precipitate was recovered by filtration and the filtrates were extracted with chloroform (2× 50 ml.). The water layer was made basic with ammonium hydroxide, and the solution was re-extracted with chloroform (2× 50 ml.). The organic layers were combined, dried over anhydrous sodium sulfate and evaporated to dryness.

The residual oil (1.1 g.) contained about 15 percent of starting material (TLC, visual estimation). The oil was dissolved in a small amount of ethanol and an excess of ethanolic hydrogen chloride was added. The solution of the salt was cooled and ether was added until the salt precipitated. The precipitate was obtained by filtration and was recrystallized from a mixture of methanol and ether to yield 7-chloro-1,3-dihydro-1-(2-ethylaminoethyl) - 5 - (2-fluorophenyl - 2H - 1,4-benzodiazepin-2-one dihydrochloride as pale yellow rods.

EXAMPLE 3

Method A

To a solution of 0.2 g. (0.00052 m.) of 7-chloro-5-(2-fluorophenyl)-1,3-dihydro - 1 - (2-[N-cyano - N - ethylamino]ethyl)-2H-1,4-benzodiazepin - 2 - one in 15 ml. of ethanol was added 1 ml. of 1 N sodium hydroxide followed by 50 ml. of a 3 percent solution of a hydrogen peroxide. The resulting mixture was stirred for 4 hrs., and was then extracted with (2× 50 ml.) of dichloromethane. The organic layers were combined and washed with 40 ml. of saturated brine solution, dried over anhydrous sodium sulfate and evaporated to dryness. The residue was recrystallized from a dichloromethane-ether mixture to give 1-ethyl-1-{2[7 - chloro - 5 - (2-fluorophenyl)-1,3- ing hexane which were decanted from the residual tars and were combined. The hexane solution was added to the second fraction and evaporated to dryness to give the base of 3-acetoxy-7-chloro-1-(2-diethylaminoethyl)- 5 - (2 - fluorophenyl) - 1,3 - dihydro - 2H - 1,4 - benzo- diazepin - 2 - one hydrochloride as an oil.

A solution of 200 mg. of the base in anhydrous ethyl ether was treated with an excess of anhydrous hydrogen chloride. The ether solution was then evaporated to dryness and the residual oil was crystallized from a mixture of acetone and ether, to give pure 3 - acetoxy - 7 - chloro - 1 - (2 - diethylaminoethyl) - 5 - (2 - fluorophenyl) - 1,3 - dihydro - 2H - 1,4 - benzodiazepin - 2 - one hydrochloride as white prisms.

EXAMPLE 9

A solution of 2.1 g. (0.0047 m.) of 3-acetoxy-7-chloro- 1 - (2 - diethylaminoethyl) - 5 - (2 - fluorophenyl) - 1,3 - dihydro - 2H - 1,4 - benzodiazepin - 2 - one hydrochloride in 25 ml. of dry chloroform was added dropwise (1 hr.) to a solution of 0.6 g. (0.0056 m.) of cyanogen bromide in dry chloroform (20 ml.) cooled in an ice bath. The reaction mixture was allowed to stand at room temperature for 16 hrs. 2 N hydrochloric acid (30 ml.) was slowly added to the reaction mixture and the reaction vessel was flushed with nitrogen gas in a hood. The resulting mixture was shaken in a separatory funnel. The chloroform layer was separated, washed with water (2× 50 ml.), saturated brine solution, dried over anhydrous sodium sulfate, and evaporated to dryness. The residual amber oil was crystallized from a mixture of methanol and ether to give 3-acetoxy-7-chloro-5-(2-fluorophenyl) - 1,3 - dihydro - 1 - (2 - [N-cyano-N-ethylamino]ethyl) - 2H - 1,4 - benzodiazepin - 2 - one as white prisms melting at 91–98°. The product was recrystallized from the same solvent mixture to give analytically pure 3 - acetoxy - 7 - chloro - 5 - (2 - fluorophenyl) - 1,3 - dihydro - 1 - (2 - [N-cyano-N-ethylamino]ethyl)-2H-1,4-benzodiazepin-2-one as white prisms melting at 94–101°.

EXAMPLE 10

A 225 mg. tablet formulation was formed containing the following ingredients:

| | Per tablet, mg. |
|---|---|
| 1-(2-aminoethyl)-7-chloro-1,3-dihydro-5-(2-fluorophenyl)-2H-1,4-benzodiazepin-2-one | 5.00 |
| Dicalcium phosphate dihydrate, unmilled | 195.00 |
| Corn starch | 24.00 |
| Magnesium stearate | 1.00 |
| Total weight | 225.00 |

The procedure employed for preparing a tablet formulation was as follows:

1 - (2 - aminoethyl) - 7 - chloro - 1,3 - dihydro - 5 - (2 - fluorophenyl) - 2H - 1,4 - benzodiazepine - 2 - one and corn starch were mixed together and passed through a #00 screen in Model "J" Fitz with hammers forward. This premix was then mixed with dicalcium phosphate and one-half of the magnesium stearate, passed through a #1A screen in Model "J" Fitz with knives forward and slugged. The slugs were passed through a #2A plate in a Model "D" Fitz at slow speed with knives forward, and the remaining magnesium stearate was added. The mixture was mixed and compressed.

EXAMPLE 11

A 225 mg. tablet was formulated in the same manner as Example 10 utilizing 1-ethyl-1-{-2[7-chloro-5-(2-fluorophenyl)1,3 - dihydro - 2 - oxo-1,4-benzodiazepin-1-yl]ethyl}urea as the active ingredient.

EXAMPLE 12

A 225 mg. tablet was formulated in the same manner as Example 10, utilizing 7-chloro-5-(2-fluorophenyl)-1,3-dihydro - 1 - (2 - [N-cyano-N-ethylamino]ethyl)-2H-1,4-benzodiazepin-2-one as the active ingredient.

EXAMPLE 13

A 10,000 cc. parenteral formulation was formed containing the following ingredients:

| | | Per cc. |
|---|---|---|
| 1 - (2 - aminoethyl) - 7 - chloro - 1,3 - dihydro- 5 - (2 - fluorophenyl) - 2H - 1,4 - benzodiazepin-2-one | mg | 0.5 |
| Propylene glycol | cc | 0.4 |
| Benzyl alcohol (benzaldehyde free) | cc | 0.015 |
| Ethanol 95% USP | cc | 0.10 |
| Sodium benzoate | mg | 48.8 |
| Benzoic acid | mg | 1.2 |
| Water for injection q.s. | cc | 1.0 |

The procedure employed for preparing a parenteral formulation was as follows:

The 5 gm. of 1-(2-aminoethyl)-7-chloro-1,3-dihydro-5-(2-fluorophenyl)-2H-1-,4-benzodiazepin-2-one were dissolved in 150 cc. of benzyl alcohol; 4,000 cc. of propylene glycol and 1,000 cc. of ethanol were added. The 12 gm. of benzoic acid were dissolved in the above. The 488 gm. of of sodium benzoate dissolved in 3,000 cc. of water for injection were added. The solution was brought up to final volume of 10,000 cc. with water for injection. The solution was filtered thru on 02 Selas candle, filled into suitable size ampuls gassed with $N_2$ and sealed. It was then autoclaved at 10 p.s.i. for 30 minutes.

EXAMPLE 14

A 10,000 cc. parenteral formulation was prepared in the same manner as Example 13 utilizing 1-ethyl-1-{2[7-chloro - 5 - (2 - fluorophenyl) - 1,3 - dihydro - 2 - oxo - 1,4-benzodiazepin-1-yl]ethyl} urea as the active ingredient.

EXAMPLE 15

A 10,000 cc. parenteral formulation was prepared in the same manner as Example 13 utilizing 7-chloro-5-(2-fluorophenyl) - 1,3 - dihydro - 1 - (2 - [N - cyano - N-ethylamino]ethyl)-2H-1,4-benzodiazepin-2-one as the active ingredient.

EXAMPLE 16

210 mg. capsule formulation was formed containing the following ingredients:

| | Per capsule, mg. |
|---|---|
| 1 - (2 - aminoethyl) - 7 - chloro - 1,3 - dihydro - 5- (2 - fluorophenyl) - 2H - 1,4 - benzodiazepine - 2-one | 10 |
| Lactose, USP | 165 |
| Corn starch, USP | 30 |
| Talc, USP | 5 |
| Total weight | 210 |

The procedure employed for preparing a capsule formulation was as follows:

1 - (2 - aminoethyl) - 7 - chloro - 1,3 - dihydro - 5 - (2-fluorophenyl)-2H-1,4-benzodiazepine-2-one, lactose and corn starch were mixed in a suitable mixer. The mixture was further blended by passing through a Fitzpatrick Comminuting Machine with a #1A screen with knives forward. The blended powder was returned to the mixer, the talc added and blended thoroughly. The mixture was filled into #4 hard shell gelatin capsules on a Parke Davis capsulating machine. (Any similar type capsulating machine may be used.)

EXAMPLE 17

A 210 mg. capsule formulation was prepared in the same manner as Example 16 utilizing 1-ethyl-1-{-2[7-chloro-5-(2-fluorophenyl) - 1,3 - dihydro - 2 - oxo - 1,4 - benzodiazepin-1-yl]ethyl} urea as the active ingredient.

EXAMPLE 18

A 210 mg. capsule formulation was prepared in the same manner as Example 16 utilizing 7-chloro-5-(2-fluorophenyl) - 1,3 - dihydro - 1 - (2 - [N - cyano - N - ethylamino]ethyl)-2H-1,4-benzodiazepin-2-one as the active ingredient.

EXAMPLE 19

A 1.3 gram suppository formulation was formed containing the following ingredients:

| | Per 1.3 gm. suppository |
|---|---|
| 1 - (2 - aminoethyl) - 7 - chloro - 1,3 - dihydro-5 - (2 - fluorophenyl) - 2H - 1,4 - benzodiazepin-2-one _____gm__ | 0.010 |
| Wecobee M [1] _____gm__ | 1.245 |
| Carnauba wax _____gm__ | 0.045 |

[1] Cocoa butter-coconut derivative having a melting point of 96° F. to 98° F. manufactured by E. F. Drew Company, New York, N.Y.

The procedure employed for preparing a suppository formulation was as follows:

The Wecobee M and the carnauba wax were melted in a suitable size glass lined container (stainless steel may also be used), mixed well and cooled to 45° C. The 1-(2-aminoethyl) - 7 - chloro - 1,3 - dihydro - 5 - (2 - fluorophenyl)-2H-1,4-benzodiazepin-2-one, which had been reduced to a fine powder with no lumps, was added and stirred until completely and uniformly dispersed. The mixture was poured into suppository molds to yield suppositories having an individual weight of 1.3 gms. The suppositories were cooled and removed from molds. They were then individually wrapped in wax paper for packaging (foil may also be used).

EXAMPLE 20

A 1.3 gram suppository formulation was prepared in the same manner as Example 19 utilizing 1-ethyl-1-{-2[7-chloro - 5 - (2 - fluorophenyl) - 1,3 - dihydro - 2 - oxo-1,4-benzodiazepin-1-yl]ethyl} urea as the active ingredient.

EXAMPLE 21

A 1.3 gram suppository formulation was prepared in the same manner as Example 19 utilizing 7-chloro-5-(2-fluorophenyl) - 1,3 - dihydro - 1 - (2 - [N - cyano - N-ethylamino]ethyl)-2H-1,4-benzodiazepin-2-one as the active ingredient.

EXAMPLE 22

7-bromo-5-(2-pyridyl)-1,3-dihydro-1-[3-(N-cyanomethylamino)propyl]-2H-1,4-benzodiazepin-2-one A solution of 5.6 g. (0.0534 moles) of cyanogen bromide in 150 ml. of chloroform was added to a solution of 25.4 g. (0.0634 moles) of 7-bromo-1,3-dihydro-1-(3-dimethylaminopropyl)-5-(2-pyridyl)-2H - 1,4 - benzodiazepine-2-one in 150 ml. of chloroform and the resulting mixture was refluxed for one hour. The reaction mixture was cooled, treated with 125 ml. of 2 N hydrochloric acid, and the two layers were separated. The chloroform solution was extracted with 125 ml. of 2 N hydrochloric acid, washed with 125 ml. of dilute ammonium hydroxide, 100 ml. of water, 100 ml. of saturated brine solution, and dried over anhydrous sodium sulfate. Removal of the solvents gave an oil which crystallized from ether. Recrystallization of the product from a mixture of dichloromethane, ether and petroleum ether (30–60°) gave 7-bromo-5-(2-pyridyl)-1,3-dihydro-1-[3 - (N - cyanomethylamino)propyl]-2H-1,4-benzodiazepin-2-one as white prisms.

EXAMPLE 23

1-methyl-1-[3-(7-bromo-5-(2-pyridyl)-1,3-dihydro-2-oxo-2H-1,4-benzodiazpin-1-yl)propyl] urea A solution of 8.0 g. (0.0194 moles) of 7-bromo-5-(2-pyridyl)-1,3-dihydro-1-[3 - (N - cyanomethylamino)propyl]-2H-1,4-benzodiazepin-2-one in 200 ml. of ethanol was treated with 200 ml. of 3% hydrogen peroxide and 10 ml. of 1 N sodium hydroxide solution. After 2 hrs. 1 l. of water was added and the solution was extracted with dichloromethane (2× 200 ml.). The combined organic layers were washed with water (3× 250 ml.), 100 ml. of saturated brine solution and dried over anhydrous sodium sulfate. The solvents were removed to give an oil which was crystallized from a mixture of dichloromethane, methanol and ether to give 1-methyl-1-[3-(7-bromo-5-(2-pyridyl)-1,3-dihydro-2-oxo-2H-1,4-benzodiazepin-1 - yl) propyl]urea as white prisms.

EXAMPLE 24

7-nitro-5-phenyl-1,3-dihydro-1-[3-(N-cyanomethylamino) propyl]-2H-1,4-benzodiazepin-2-one A solution of 5.6 g. (0.0534 moles) of cyanogen bromide in 75 ml. of chloroform was added dropwise to a solution of 13 g. (0.0355 moles) of 1-(3-dimethylaminopropyl)-7-nitro-5-phenyl-1,3-dihydro-2H-1,4 - benzodiazepin-2-one in 75 ml. of chloroform. The reaction mixture was refluxed for 3 hrs., cooled and treated with 75 ml. of 2 N hydrochloric acid. The two layers were separated, and an oil which was insoluble in both layers was discarded. The chloroform solution was extracted with 75 ml. of 2 N hydrochloric acid, and was then washed with 100 ml. of dilute ammonium hydroxide, 100 ml. of water, 75 ml. of saturated brine solution, and dried over anhydrous sodium sulfate. The solution was evaporated to dryness, and the resulting 9 g. of oil was dissolved in benzene and filtered through 200 g. of "Florisil." Elution with 250 ml. of benzene, and then 500 ml. of ether gave 1.3 g. of by-products which were discarded. From ethyl acetate was obtained 6 g. of an oil which was crystallized from a mixture of dichloromethane and ether to give 7-nitro-5-phenyl-1,3-dihydro-1-[3 - (N - cyanomethylamino)propyl]-2H-1,4-benzodiazepin-2-one as pale yellow plates.

EXAMPLE 25

1-methyl-1-[3-(7-nitro-5-phenyl-1,3-dihydro-2-oxo-2H-1,4-benzodiazepin-1-yl)propyl]urea A solution of 2.1 g. (0.00557 moles) of 7-nitro-5-phenyl-1,3-dihydro-1-[3-(N - cyanomethylamino)propyl]-2H-1,4-benzodiazepin-2-one in 200 ml. of ethanol was treated with 10 ml. of 1 N sodium hydroxide followed by 200 ml. of 3% hydrogen peroxide. The mixture was stirred for 2 hours at room temperature, poured into 800 ml. of water, and then extracted with 2× 150 ml. of dichloromethane. The organic layers were combined, washed with 3× 500 ml. of water, 100 ml. of saturated brine solution, dried over anhydrous sodium sulfate and evaporated to dryness. The oil was crystallized first from a mixture of methanol and ether and finally from a mixture of dichloromethane and ether to give 1-methyl-1-[3-(7-nitro-5-phenyl-1,3-dihydro-2-oxo-2H-1,4 - benzodiazepin-1-yl)propyl]urea as pale yellow prisms.

EXAMPLE 26

1-[2-(N-cyanomethylamino)ethyl]-1,3-dihydro-5-phenyl-7-trifluoromethyl-2H-1,4-benzodiazepin-2-one A solution of 1.2 g. (0.0116 moles) of cyanogen bromide in 20 ml. of chloroform was added to a solution of 2.9 g. (0.00774 moles) of 1,3-dihydro-1-(2-dimethylaminoethyl)-5-phenyl-7-trifluoromethyl-2H - 1,4 - benzodiazepin-2-one in 30 ml. of chloroform and was heated under reflux for 1.5 hours. The reaction mixture was cooled and treated with 25 ml. of 2 N hydrochloric acid. The two layers were separated and the chloroform layer was extracted with 25 ml. of 2 N hydrochloric acid, washed with 50 ml. of dilute ammonium hydroxide, 50 ml. of water and 25 ml. of a saturated brine solution. The solution was next dried over anhydrous sodium sulfate and evaporated to dryness to give an oil which was dissolved in benzene and chromatographed over 75 g. of silica gel. The benzene fraction was discarded. The ether fraction (300 ml.) gave, after removal of solvent, the product which was crystallized from ether. Elution with 300 ml. of ethyl acetate gave an additional portion of the product. Recrystallization of the combined product from a mixture of ether and petroleum ether (30–60°) gave 1-[2-(N-cyanomethylamino)ethyl]-1,3-dihydro - 5-phenyl-7-trifluoromethyl-2H-1,4-benzodiazepin-2 - one as white rods.

EXAMPLE 27

1-methyl-1-[2-(7-trifluoromethyl-5-phenyl-1,3-dihydro-2-oxo-2H-1,4-benzodiazepin-1-yl)ethyl]urea A solution of 1.2 g. (0.00311 moles) of 1-[2-(N-cyanomethylamino)ethyl]-1,3-dihydro-5-phenyl - 7 - trifluoromethyl-2H-1,4-benzodiazepin-2-one in 50 ml. of ethanol was treated with 1 ml. of 1 N sodium hydroxide solution followed by 20 ml. of 3% hydrogen peroxide solution. The reaction mixture was stirred for 1.5 hours, at room temperature, poured into 250 ml. of water and extracted with 2× 75 ml. of dichloromethane. The organic layers were combined, washed with water (3× 75 ml.), 75 ml. of a saturated brine solution, dried over anhydrous sodium sulfate, and evaporated to dryness. The residue was recrystallized from a mixture of dichloromethane and ether to give 1-methyl-1-[2-(7-trifluoromethyl-5-phenyl-1,3 - dihydro-2-oxo-2H-1,4-benzodiazepin-1-yl)ethyl]urea as white prisms.

What is claimed is:
1. A compound selected from the group consisting of compounds of the formula

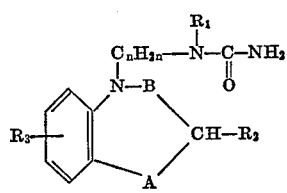

compounds of the formula

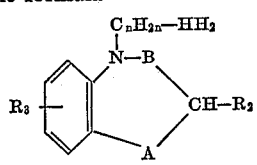

wherein A is selected from the group consisting of

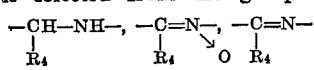

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl, and pyridyl and pharmaceutically acceptable salts thereof.

2. A compound of claim 1 having the formula:

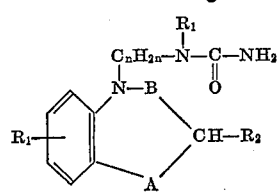

wherein A is selected from the group consisting of

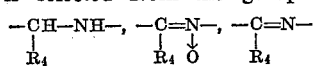

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl and pyridyl.

3. 1 - Ethyl-1-{2[7-chloro-5-(2-fluorophenyl)-1,3-dihydro-2-oxo-1,4-benzodiazepin-1-yl]ethyl}urea.

4. 1 - methyl-1-[3-(7-bromo-5-(2-pyridyl)-1,3-dihydro-2-oxo-2H-1,4-benzodiazepin-1-yl)propyl]urea.

5. 1 - methyl-1-[2-(7-trifluoromethyl-5-phenyl-1,3-dihydro-2-oxo-2H-1,4-benzodiazepin-1-yl)ethyl]urea.

6. The compound of claim 1 having the formula:

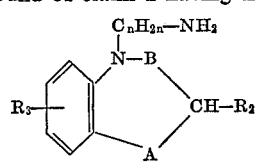

wherein A is selected from the group consisting of

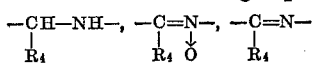

B is selected from the group consisting of carbonyl and methylene; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano, and trifluoromethyl, and $R_4$ is selected from the group consisting of phenyl, lower alkyl substituted phenyl, halo substituted phenyl, nitro substituted phenyl, and pyridyl.

7. 1 - (2-aminoethyl)-7-chloro-1,3-dihydro-5-(2-fluorophenyl)-2H-1,4-benzodiazepin-2-one.

8. A compound selected from the group consisting of

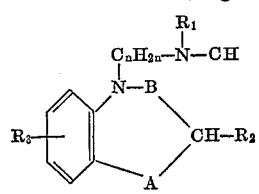

wherein A is selected from the group consisting of

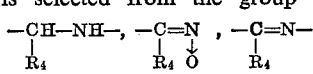

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl and pyridyl and pharmaceutically acceptable salts thereof.

9. 7 - chloro-5-(2-fluorophenyl)1,3-dihydro-1-(2-[N-cyano-N-ethyl-amino]ethyl)-2H-1,4-benzodiazepin-2-one.

10. 7 - bromo-5-(2-pyridyl)-1,3-dihydro-1-[3-(N-cyanomethylamino)propyl]-2H-1,4-benzodiazepin-2-one.

11. 1 - [ - (N-cyanomethylamino)ethyl]-1,3-dihydro-5-phenyl-7-nitro-2H-1,4-benzodiazepin-2-one.

12. A compound of the formula:

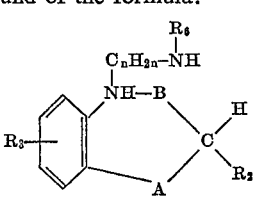

wherein A is selected from the group consisting of

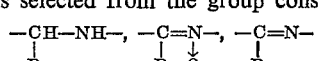

B is selected from the group consisting of carbonyl and methylene, $n$ is an integer from 2 to 7; $R_2$ is selected from the group consisting of hydrogen, lower alkyl, hydroxy and lower alkanoyloxy; $R_3$ is halogen, lower alkyl, nitro, cyano and trifluoromethyl, $R_4$ is selected from the group consisting of phenyl, lower alkyl substituted phenyl, halo substituted phenyl, nitro substituted phenyl, and pyridyl, and $R_6$ is carbobenzoxy.

13. A process for producing a substituted alkyl urea of the formula:

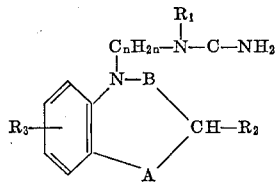

wherein A is selected from the group consisting of

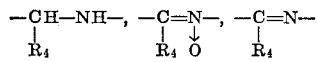

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl, and pyridyl comprising hydrolyzing an N-cyano compound of the formula

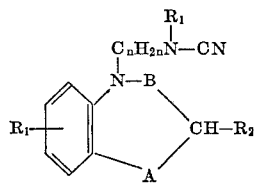

wherein $n$, A, B, $R_1$, $R_2$ and $R_3$ are as above, to form said substituted alkyl urea.

14. The process of claim 13 wherein said N-cyano compound is hydrolyzed by treating said compound with a dilute peroxide at a temperature of from 15° to 45° C.

15. The process of claim 13 wherein said N-cyano is hydrolyzed by treating said compound with a strong concentrated acid at a temperature of about 80° C. to 100° C.

16. The process of claim 15 wherein said acid is concentrated sulfuric acid.

17. A process for producing an alkyl amino compound of the formula

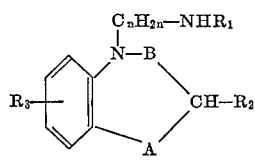

wherein A is selected from the group consisting of

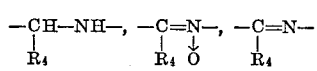

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano, and trifluoromethyl, and $R_4$ is selected from the group consisting of phenyl, lower alkyl substituted phenyl, nitro substituted phenyl, and pyridyl from an N-cyano compound of the formula:

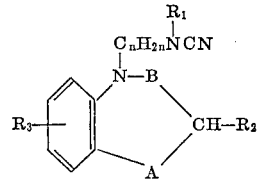

wherein A, $n$, B, $R_1$, $R_2$ and $R_3$ are as above, comprising treating said N-cyano compound with a concentrated inorganic acid at temperatures of from about 150° C. to 210° C.

18. The process of claim 17 wherein said acid is concentrated sulfuric acid.

19. A process for producing an N-cyano compound of the formula:

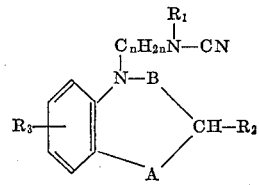

wherein A is selected from the group consisting of

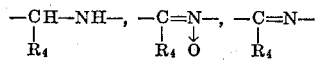

B is selected from the group consisting of carbonyl and methylene, $R_1$ is lower alkyl; $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl and pyridyl comprising reacting a compound of the formula

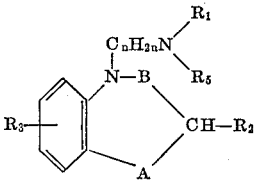

wherein $n$, A, B, $R_1$, $R_2$ and $R_3$ are as above and $R_5$ is a lower alkyl, with a cyanogen halide.

20. The process of claim 19 wherein said reaction is carried out in the presence of an inert organic solvent at the reflux temperature of said solvent.

21. A process for preparing a compound of the formula

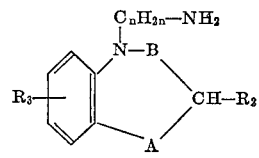

wherein A is selected from the group consisting of

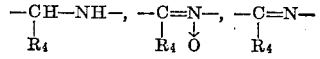

B is selected from the group consisting of carbonyl and methylene, $n$ is an integer from 2 to 7; $R_2$ is selected from the group consisting of hydrogen, lower alkyl, hydroxy and lower alkanoyloxy; $R_3$ is halogen, hydrogen, lower alkyl, nitro, cyano and trifluoromethyl, $R_4$ is selected from the group consisting of phenyl, lower alkyl substituted phenyl, halo substituted phenyl, nitro substituted phenyl and pyridyl and $R_5$ is lower alkyl comprising treating a carbobenzoxy compound of the formula:

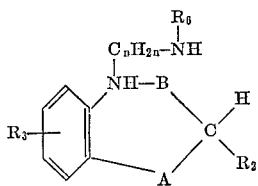

wherein $n$, $R_2$, $R_3$, A and B are as above and $R_6$ is carbobenzoxy, with a hydrolyzing agent.

22. The process of claim 21 wherein said acidic hydrolyzing agent is selected from the group consisting of solutions of hydrohalides in nonaqueous organic acids.

23. The process of claim 21 wherein said carbobenzoxy compound is formed by treating the sodio derivative of a compound of the formula

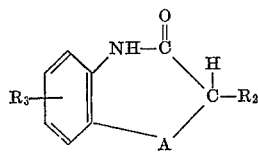

wherein A is selected from the group consisting of

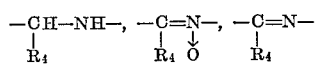

$R_2$ is selected from the group consisting of hydrogen, lower alkyl, hydroxy and lower alkanoyloxy; $R_3$ is halogen, hydrogen, lower alkyl, nitro, cyano and trifluoromethyl, and $R_4$ is selected from the group consisting of phenyl, lower alkyl substituted phenyl, halo substituted phenyl, nitro substituted phenyl and pyridyl with a halo substituted alkyl carbobenzoxy amine wherein said alkyl group contains from 2 to 7 carbon atoms.

References Cited

UNITED STATES PATENTS 3,299,053   1/1967   Archer et al.

OTHER REFERENCES

Fieser and Fieser, "Advanced Organic Chemistry," p. 495–496, Reinhold (1961).

HENRY R. JILES, Primary Examiner

R. T. BOND, Assistant Examiner

U.S. Cl. X.R.

260—239, 294.9, 295, 296; 424—244, 263

UNITED STATES PATENT OFFICE
CERTIFICATE OF CORRECTION

Patent No. 3,464,978      Dated September 2, 1969

Inventor(s) James Valentine Earley et al.

It is certified that error appears in the above-identified patent and that said Letters Patent are hereby corrected as shown below:

Claim 2,
Column 13, line 60

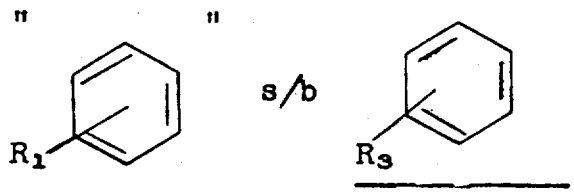

Claim 13,
Column 15, line 10

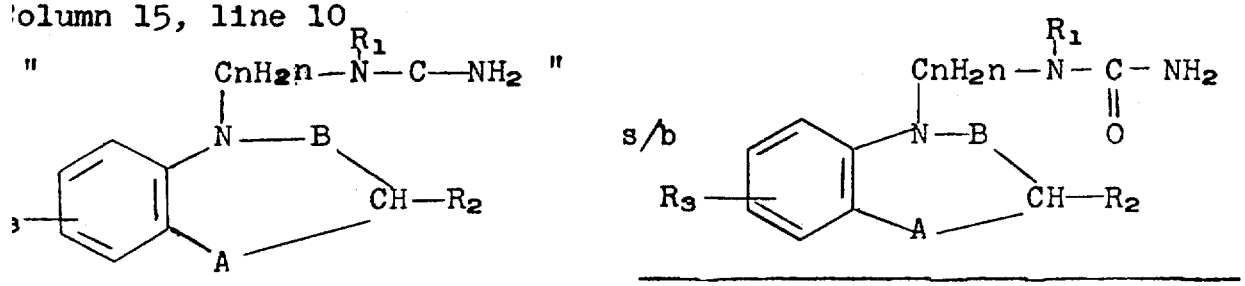

Claim 8, Column 14, line 34

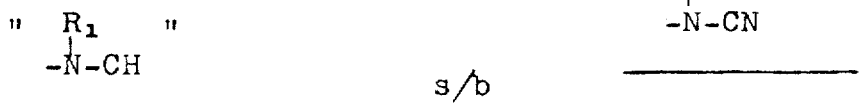

Column 2, line 16

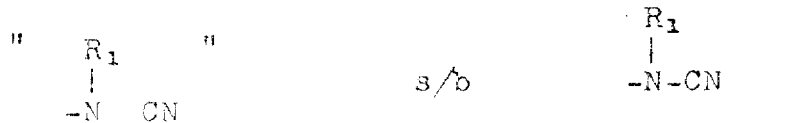

PO-1050
(5/69)

UNITED STATES PATENT OFFICE
CERTIFICATE OF CORRECTION

Patent No. 3,464,978          Dated September 2, 1969

Inventor(s) James Valentine Earley et al.    Page - 2

It is certified that error appears in the above-identified patent and that said Letters Patent are hereby corrected as shown below:

Claim 13, column 15, line 34

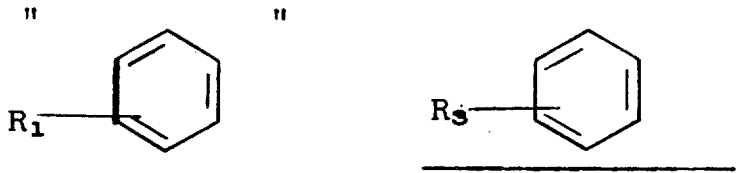

Signed and sealed this 28th day of November 1972.

SEAL)
ttest:

DWARD M.FLETCHER,JR.                      ROBERT GOTTSCHALK
ttesting Officer                              Commissioner of Patents